United States Patent
Walz et al.

(10) Patent No.: US 7,625,172 B2
(45) Date of Patent: Dec. 1, 2009

(54) VANE PLATFORM COOLING

(75) Inventors: Christopher S. Walz, Branford, CT (US); David J. Wasserman, Hamden, CT (US); Alex D. Wong, South Windsor, CT (US); Kirk D. Hlavaty, East Hartford, CT (US); Donald E. Evans, Mansfield Center, CT (US)

(73) Assignee: United Technologies Corporation, Hartford, CT (US)

( * ) Notice: Subject to any disclaimer, the term of this patent is extended or adjusted under 35 U.S.C. 154(b) by 442 days.

(21) Appl. No.: 11/412,291

(22) Filed: Apr. 26, 2006

(65) Prior Publication Data

US 2007/0253816 A1    Nov. 1, 2007

(51) Int. Cl.
*F01D 5/18* (2006.01)
(52) U.S. Cl. ...................... 415/115; 416/96 R
(58) Field of Classification Search ................ 415/115, 415/116; 416/96 R, 97 R; 29/889.2, 889.21
See application file for complete search history.

(56) References Cited

U.S. PATENT DOCUMENTS

| 5,344,283 A | 9/1994 | Magowan et al. |
| 5,413,458 A | 5/1995 | Calderbank |
| 5,997,245 A * | 12/1999 | Tomita et al. ............... 415/115 |
| 2005/0058545 A1* | 3/2005 | Cardenas .................. 416/97 R |
| 2005/0135923 A1 | 6/2005 | Coons et al. |

* cited by examiner

*Primary Examiner*—Edward Look
*Assistant Examiner*—Dwayne J White
(74) *Attorney, Agent, or Firm*—Bachman & LaPointe, P.C.

(57) ABSTRACT

A vane cluster has a platform, a shroud, and at least first and second airfoils extending between an outer face of the platform and an inner face of the shroud. Each airfoil has a pressure side and a suction side. The pressure side of the first airfoil faces the suction side of the second airfoil. The cluster includes a cooling passageway system. The system includes at least one inlet in the shroud. At least one first feed passageway extends from the shroud to the platform through the first airfoil. At least one second feed passageway extends from the shroud to the platform through the second airfoil. A first platform cooling plenum is to the pressure side of the first airfoil. A second platform cooling plenum is to the suction side of the first airfoil.

27 Claims, 9 Drawing Sheets

VANE PLATFORM COOLING

U.S. GOVERNMENT RIGHTS

The invention was made with U.S. Government support under contract F33657-99-D-2051-0014 awarded by the U.S. Air Force. The U.S. Government has certain rights in the invention.

BACKGROUND OF THE INVENTION

The invention relates to cooling of high temperature components. More particularly, the invention relates to film cooling of gas turbine engine components.

In the aerospace industry, a well-developed art exists regarding the cooling of components such as gas turbine engine components. Exemplary components are gas turbine engine blades and vanes. Exemplary blades and vanes airfoils are cooled by airflow directed through the airfoil to be discharged from cooling holes in the airfoil surface. Also, there may be cooling holes along the vane shroud or vane or blade platform. The cooling mechanisms may include both direct cooling as the airflow passes through the component and film cooling after the airflow has been discharged from the component but passes downstream close to the component exterior surface.

By way of example, cooled vanes are found in U.S. Pat. Nos. 5,413,458 and 5,344,283 and U.S. Application Publication 20050135923. Exemplary cooled vanes are formed by an investment casting process. A sacrificial material (e.g., wax) is molded over one or more cores (e.g., refractory metal cores and/or ceramic cores) to form a pattern. The pattern is shelled. The shell is dewaxed. Alloy (e.g., nickel- or cobalt-based superalloy) is cast in the shell. The shell and core(s) may be destructively removed (e.g., by mechanical means and chemical means, respectively). The casting may be finish machined (including surface machining and drilling of holes/passageways). The casting may be coated with a thermal and/or erosion-resistant coating.

SUMMARY OF THE INVENTION

Accordingly, one aspect of the invention involves a vane cluster having a platform, a shroud, and at least first and second airfoils extending between an outer face of the platform and an inner face of the shroud. Each airfoil has a pressure side and a suction side. The pressure side of the first airfoil faces the suction side of the second airfoil. The cluster includes a cooling passageway system. The system includes at least one inlet in the shroud. At least one first feed passageway extends from the shroud to the platform through the first airfoil. At least one second feed passageway extends from the shroud to the platform through the second airfoil. A first platform cooling plenum is to the pressure side of the first airfoil. A second platform cooling plenum is to the suction side of the first airfoil.

In various implementations, the cluster may include a casting essentially forming the shroud, airfoils, and a majority of the platform. The cluster may include one or more covers enclosing the first and second platform cooling plenums.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
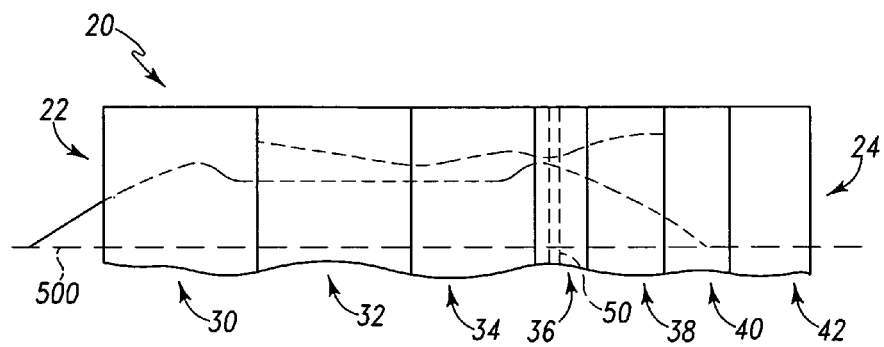
FIG. 1 is a schematic view of a gas turbine engine.

FIG. 1 shows a gas turbine engine 20 having a central longitudinal axis 500 and extending from an upstream inlet 22 to a downstream outlet 24. From upstream to downstream, the engine may have a number of sections along a core flowpath. From upstream to downstream, the sections may include a low speed/pressure compressor (LPC) 30, a high speed/pressure compressor (HPC) 32, a combustor 34, a high speed/pressure turbine (HPT) 36, a low speed/pressure turbine (LPT) 38, an augmentor 40, and an exhaust duct/nozzle 42. Each of the compressor and turbine sections may include a number of blade stages interspersed with a number of vane stages. The blades of the LPC and LPT are mounted on a low speed spool for rotation about the axis 500. The blades of the HPC and HPT are mounted on a high speed spool for such rotation.

Figure 2:
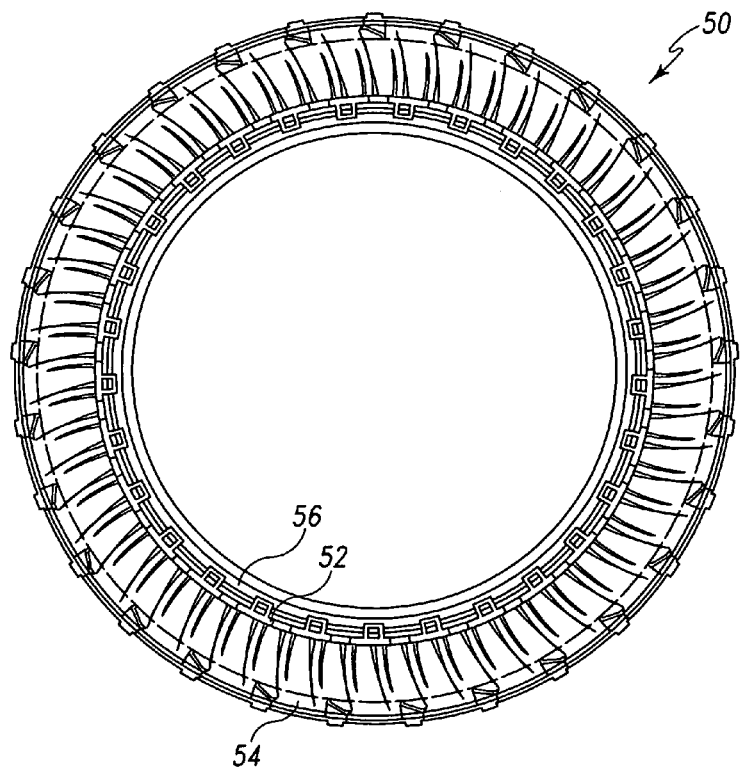
FIG. 2 is a view of a vane ring of the engine of FIG. 1.

As is discussed in further detail below, one or more of the vane stages may be formed as a cluster ring. For example, a second vane stage 50 of the HPT 36 is schematically shown in FIG. 1. FIG. 2 shows further details of the exemplary vane stage 50. The ring includes an inboard platform 52 and an outboard shroud 54. A circumferential array of airfoils (discussed below) span between the platform and shroud. As is discussed in further detail below, the ring may be segmented into a plurality of separately-formed clusters interlocked at the platforms by a structural ring 56 and at the shrouds by an engine case.

Figure 3:
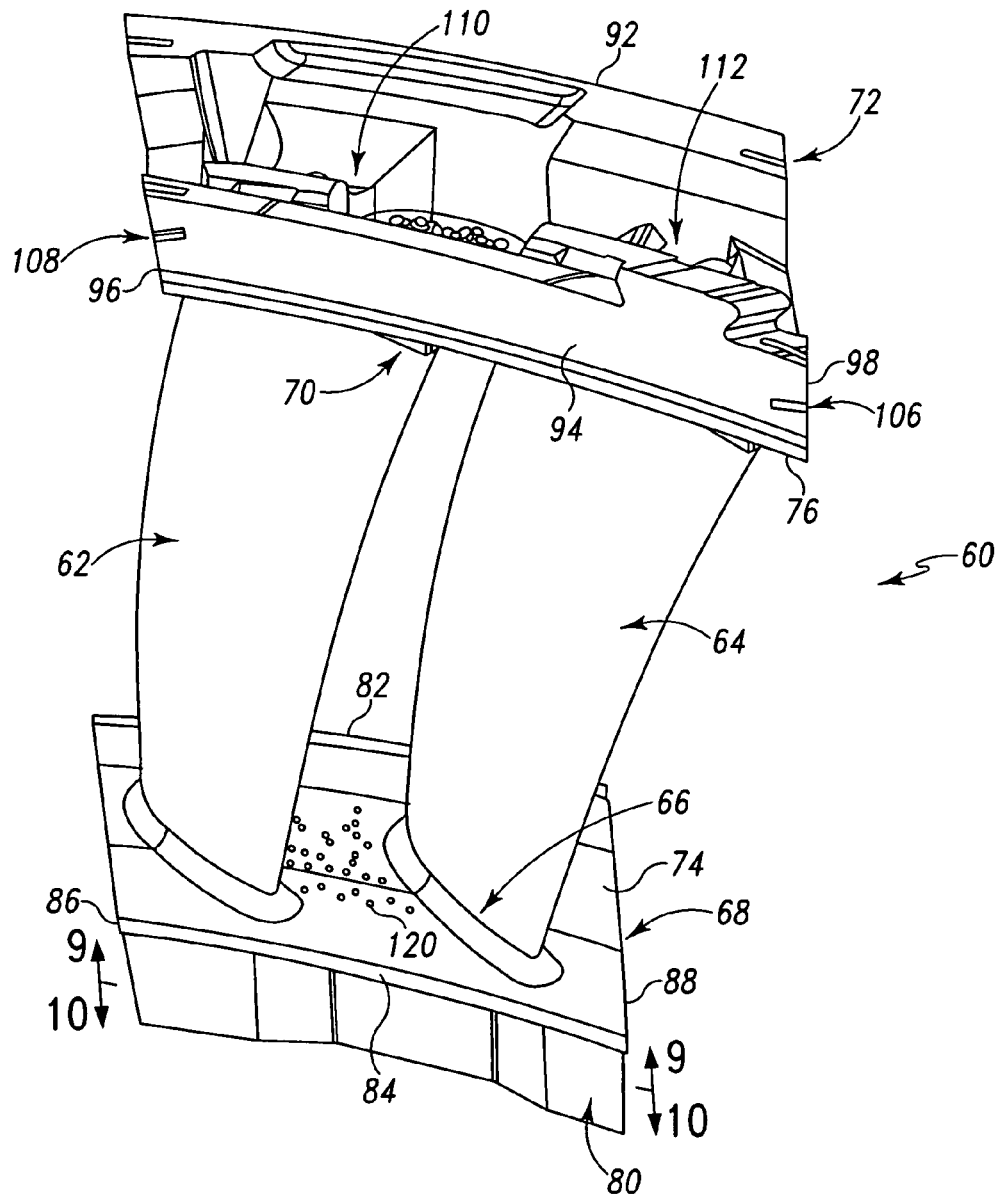
FIG. 3 is a view of a vane cluster of the ring of FIG. 2.

FIG. 3 shows an exemplary two-airfoil cluster 60. Each exemplary cluster includes a first airfoil 62 and a second airfoil 64. Each of the airfoils extends from an associated inboard end 66 at a platform segment 68 to an associated outboard end 70 at a shroud segment 72. The exemplary platform segment has an outboard surface 74 along the inboard extreme of the core flowpath. The shroud segment has an inboard surface 76 along an outboard extreme of the core flowpath.

An underside 80 of the platform segment may include features for mounting each platform segment to its adjacent segments (e.g., by bolting to the ring 56). The platform segment has a forward/upstream end 82, a rear/downstream end 84, and first and second circumferential ends or matefaces 86 and 88. Similarly, the shroud segment 72 has an upstream end 92, a downstream end 94, and first and second circumferential ends 96 and 98. Each of the platform circumferential ends 86 and 88 may include a groove or channel 100 (FIG. 4) and 102 (FIG. 5) for receiving a seal (not shown). A given such seal spans the gap between the adjacent grooves 100 and 102 of each adjacent pair of clusters. The shroud circumferential ends 96 and 98 may also include seal-receiving features 106 and 108.

Figure 4:
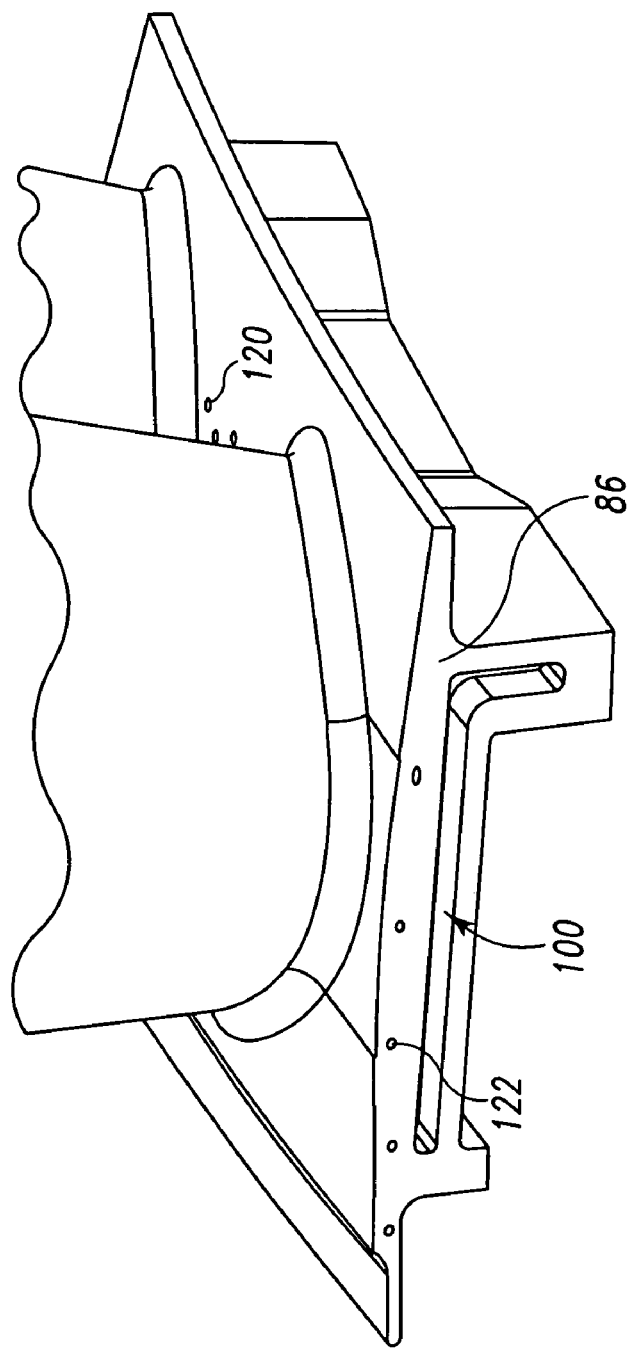
FIG. 4 is a first view of a platform of the cluster of FIG. 3.
Figure 5:
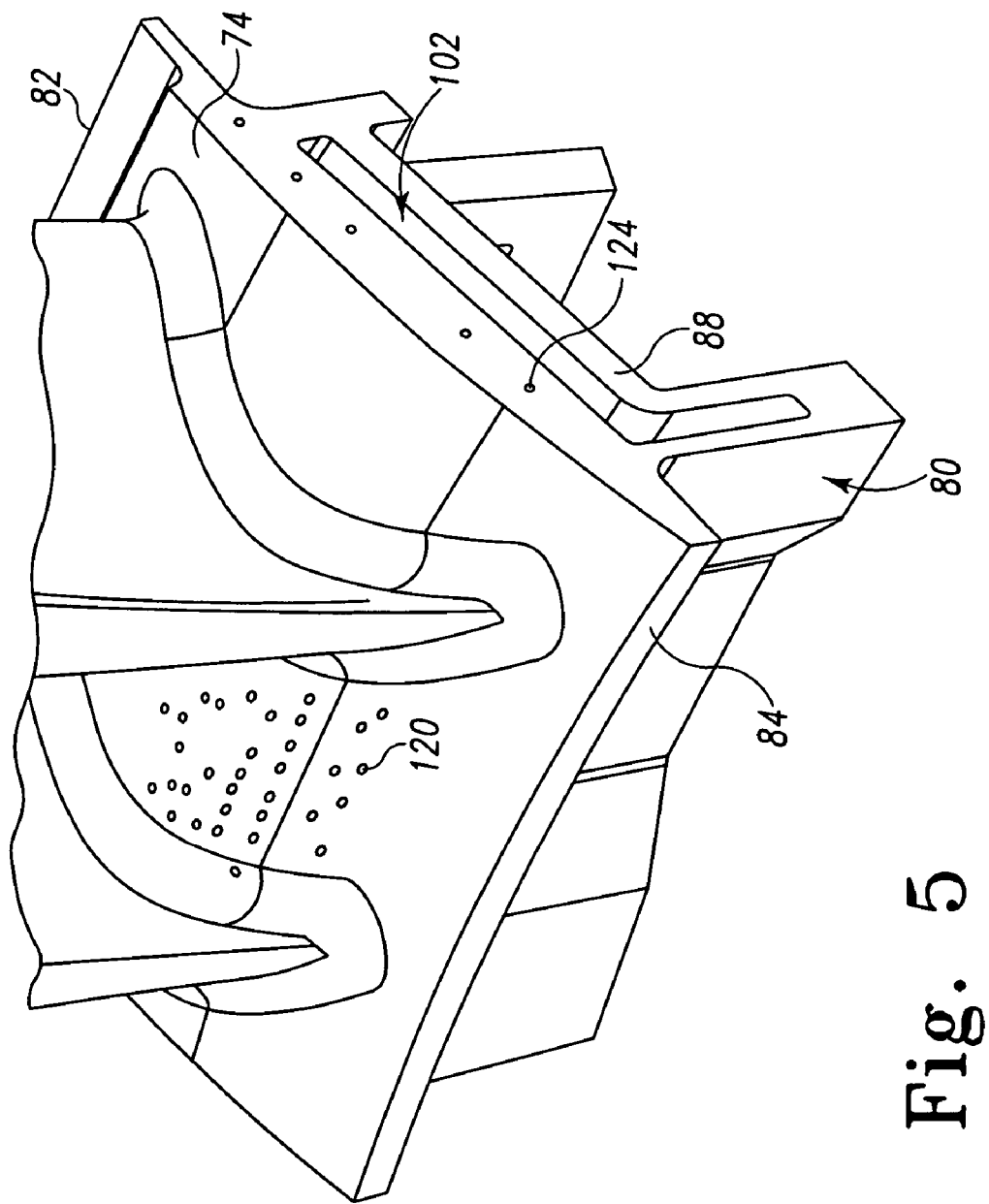
FIG. 5 is a second view of the platform of the cluster of FIG. 3.

The cluster 60 has cooling passageways. An exemplary passageway network may include one or more inlet ports 110 and 112 in the shroud segment 72. The ports 110 and 112 direct cooling air (e.g., bleed air) through one or more spanwise passageway segments in the airfoils 62 and 64. Some of this airflow may exit cooling holes (not shown) along the airfoils. Some of the airflow, however, enters the platform segment 68 to provide platform cooling. Such air may exit the platform through one or more outlet holes. For example, FIGS. 4 and 5 show outlet holes 120 along the platform outboard surface 74. FIGS. 4 and 5, respectively, also show outlet holes 122 and 124 along the platform circumferential ends 86 and 88.

Figure 6:
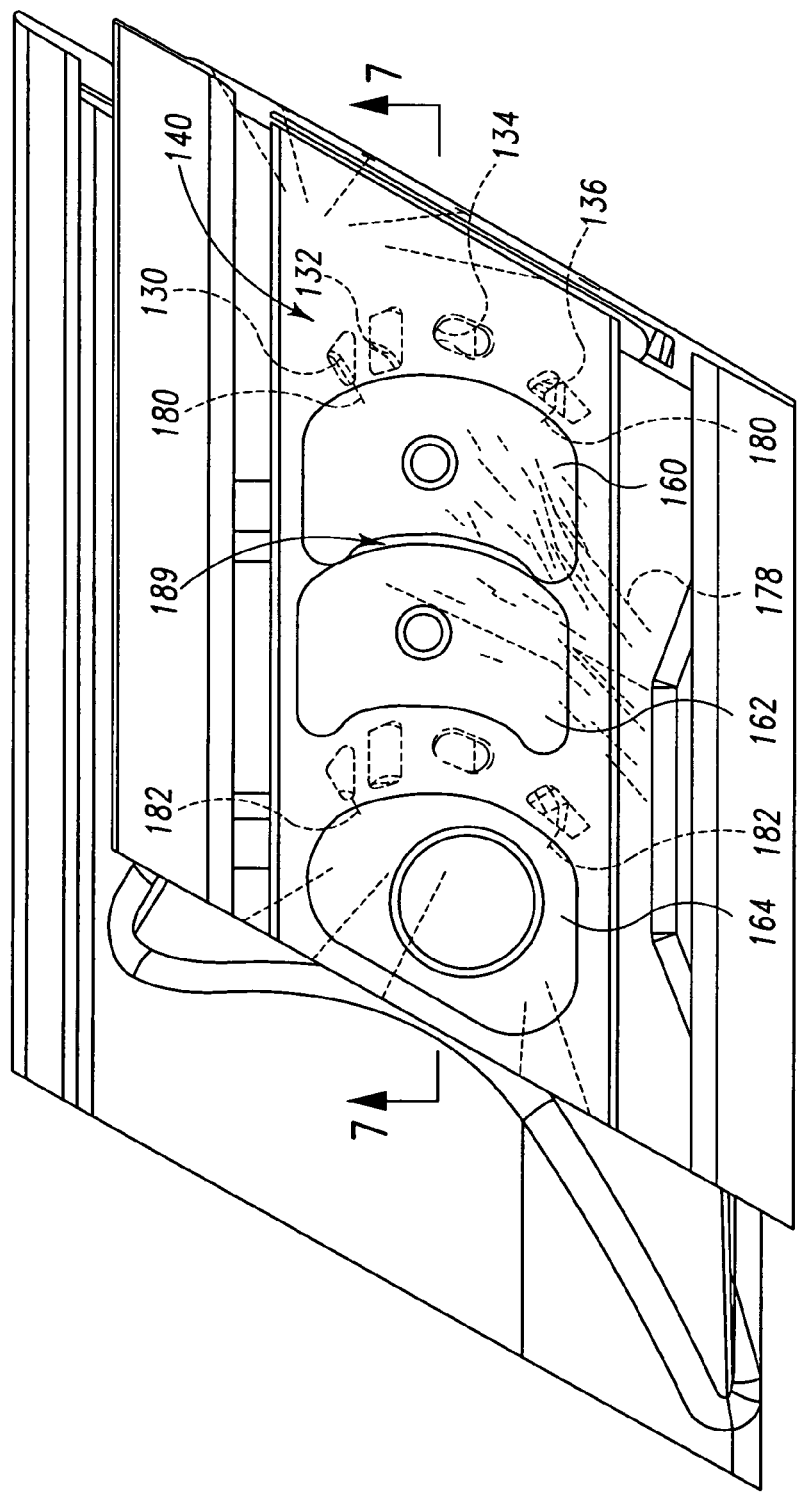
FIG. 6 is an underside view of the cluster of FIG. 3.
Figure 7:
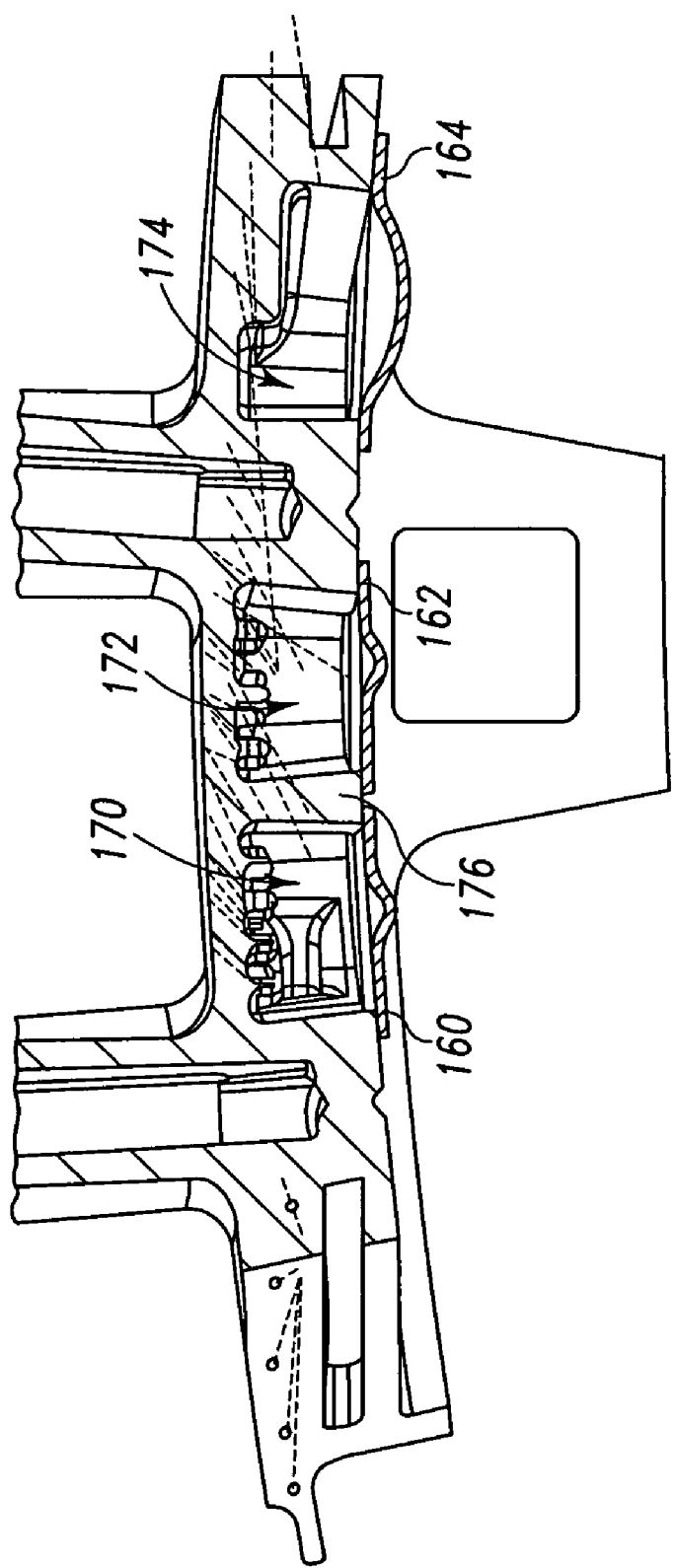
FIG. 7 is a cross-sectional view of the cluster of FIG. 6 taken along line 7-7.

FIG. 6 is a view of the platform looking radially outward. FIG. 6 also shows end portions 130, 132, 134, and 136 of the spanwise passageways. When the cluster main body is initially cast, these passageways are open to the platform underside 140 but are subsequently closed (e.g., by plug welding). FIG. 6 further shows covers 160, 162, 164 secured (e.g., by welding) to a casting of the cluster. Exemplary covers are stamped or lasercut from Ni-based superalloy sheet (e.g., Inconel alloy 625 (UNS N06625)). The cover material may be selected for weld and thermal compatibility with the cluster body alloy (e.g., a single crystal Ni-based superalloy casting). The exemplary covers 160, 162, and 164 cover openings to plenums 170, 172, and 174 (FIG. 7). The exemplary first plenum 170 is immediately to the pressure side of the first airfoil. The exemplary second plenum 172 is immediately to the suction side of the second airfoil and separated from the first plenum by a dividing wall 176. The exemplary third plenum 174 is immediately to the pressure side of the second airfoil. For reference, these relative positions are characterized when viewed in superposition normal to the airfoil spans. The plenums are, however, positioned radially inward of the adjacent airfoil surfaces.

In the exemplary cluster, each of the plenums 170 and 172 feeds an associated subgroup of the outlet holes 120. For example, in an initial casting process, the plenums may be cast by ceramic cores which may be separately formed from the ceramic feed cores forming the spanwise passageways. After the decoring process, the holes 120 and their associated outlet passageways 178 (schematically shown in FIG. 6 by their centerlines) from the respective plenums 170 and 172 may be drilled (e.g., via laser drilling or electrodischarge machining (EDM)). In the exemplary embodiment, the plenum 170 is fed by the first airfoil's spanwise passageways through one or more feed passageways 180. The passageways 180 may be cast in place or may be drilled (e.g., in the same step as the outlet passageways 178). In the exemplary cluster, the plenum 172 is indirectly fed from the second airfoil's spanwise passageways via the plenum 174. In the particular example, feed passageways 182 may be drilled from the plenum 174 to the second airfoil's spanwise passageways.

Figure 8:
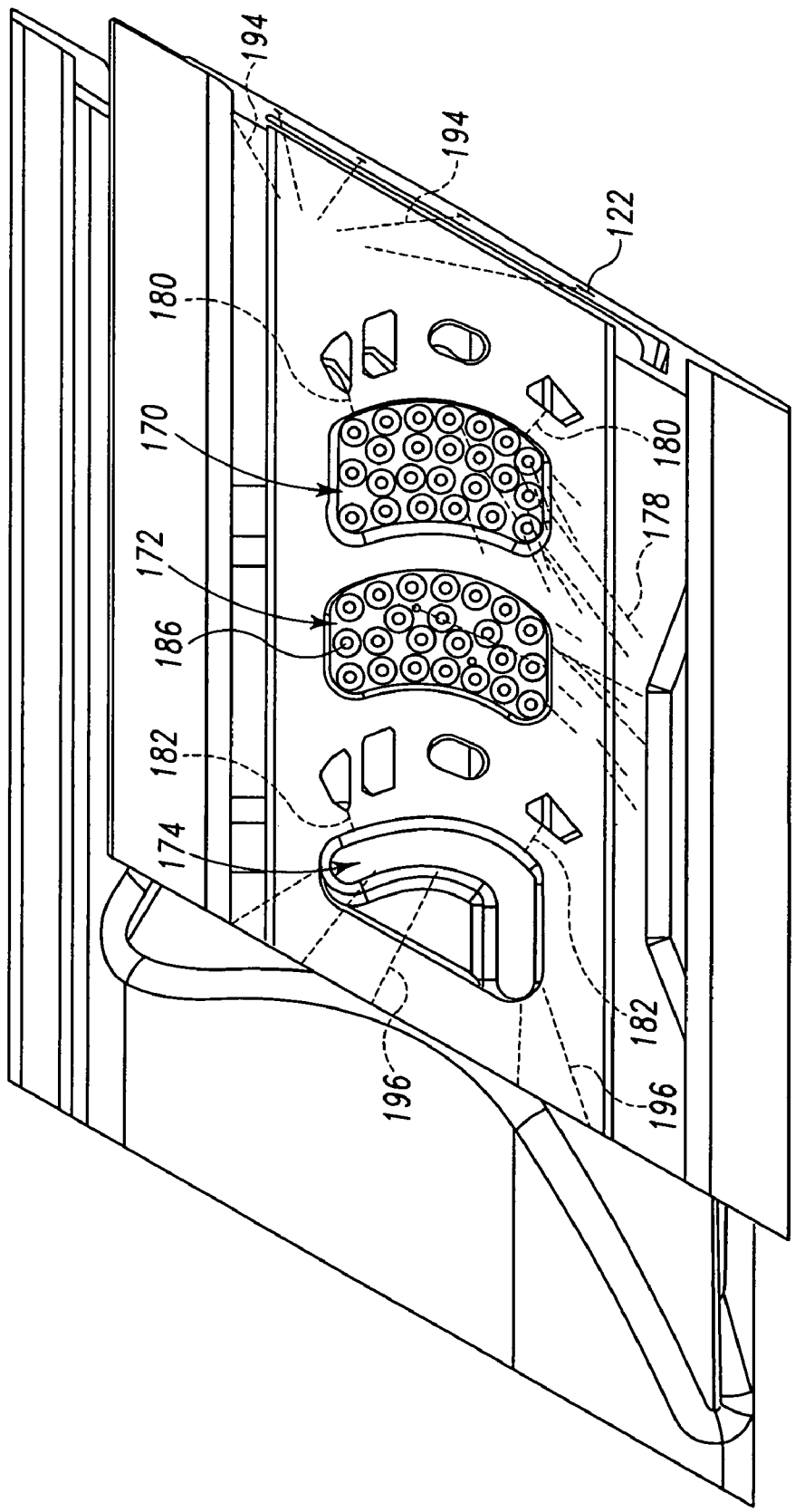
FIG. 8 is a view of the underside of the cluster of FIG. 3 with covers removed.
Figure 9:
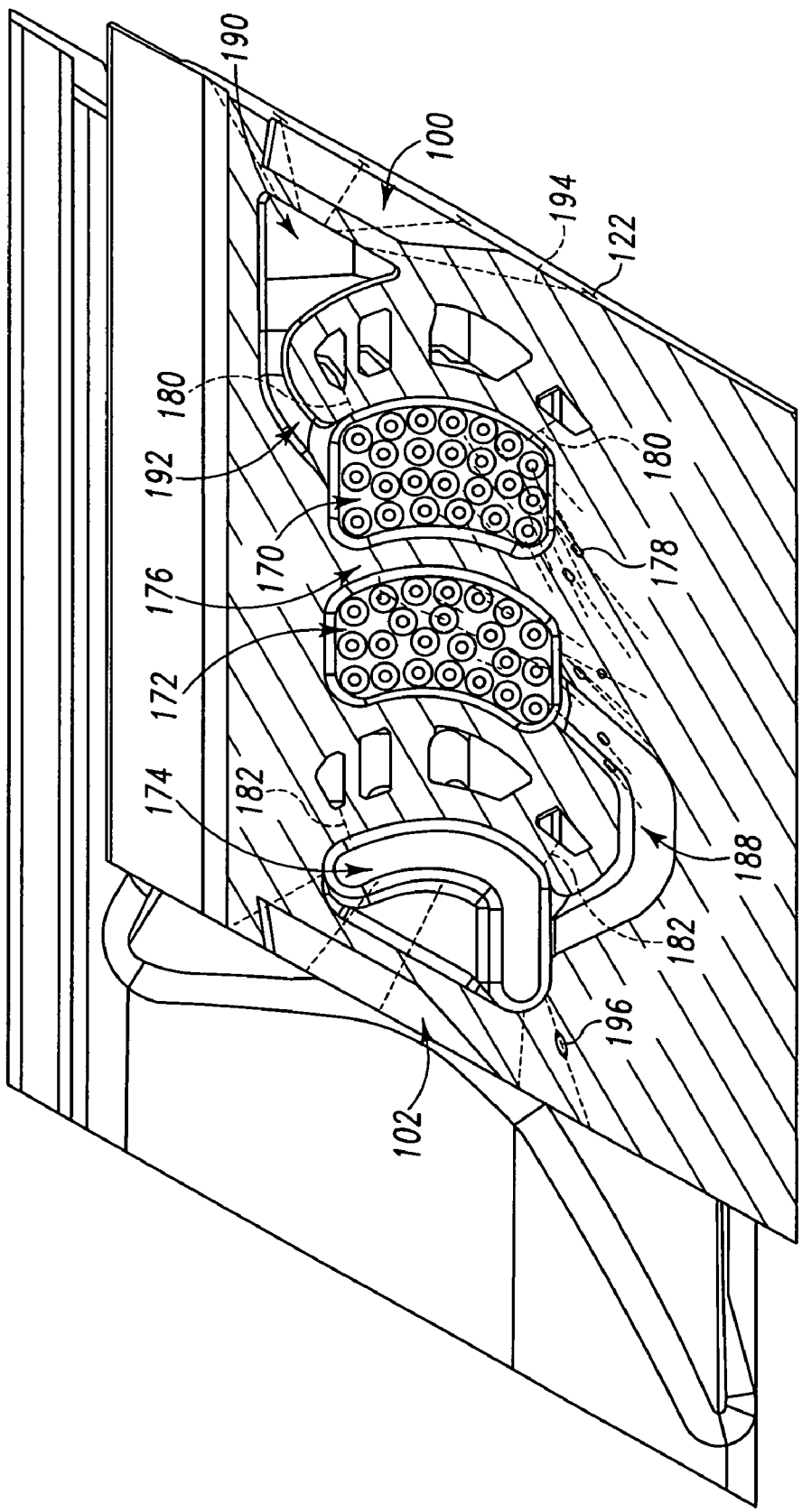
FIG. 9 is a cross-sectional view of the cluster of FIG. 3 taken along line 9-9.
Figure 10:
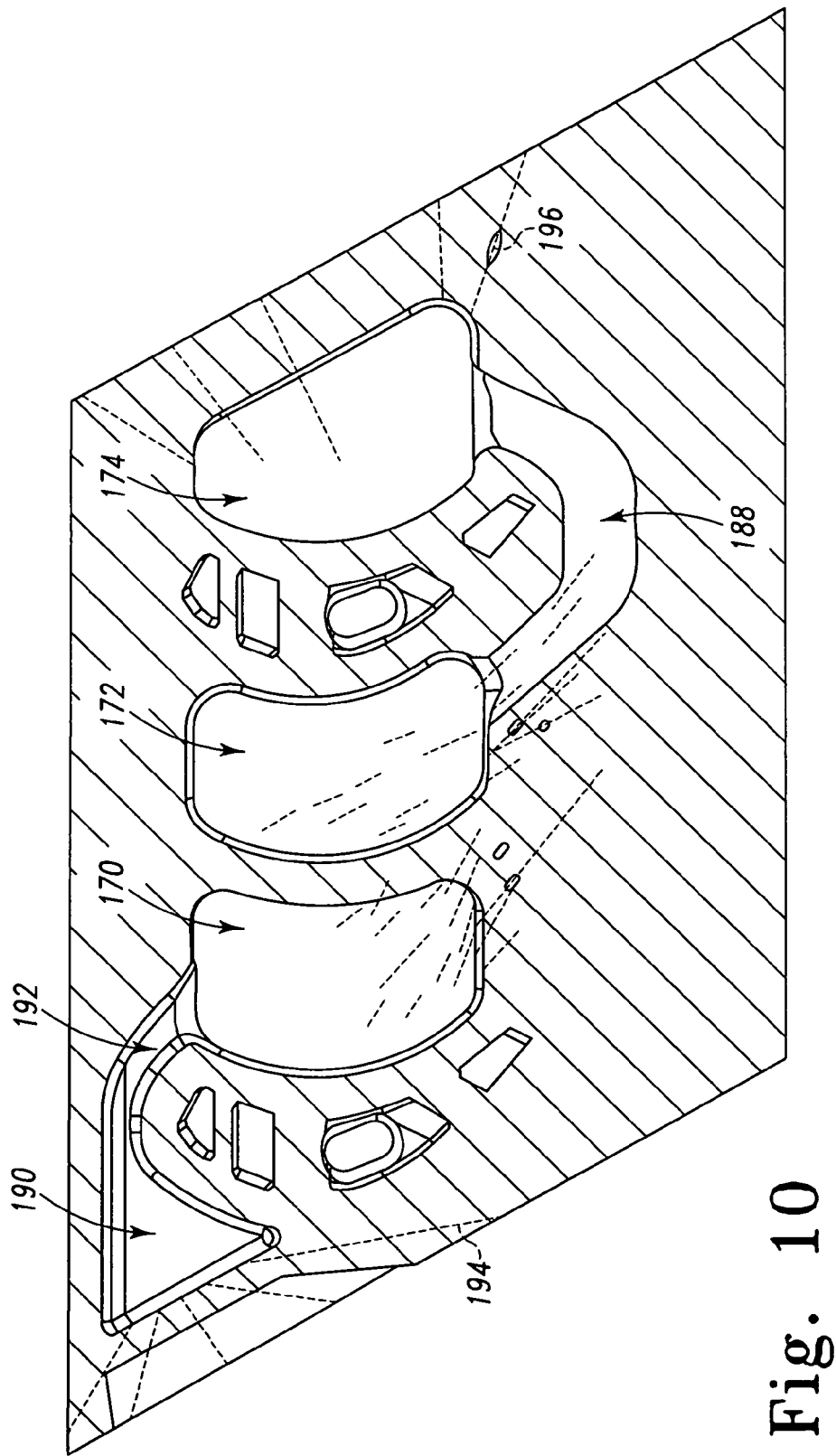
FIG. 10 is a cross-sectional view of the cluster of FIG. 3 taken along line 10-10.

FIG. 8 also shows the plenums 170 and 172 as being cast with a plurality of heat transfer pedestals 186. A connector passageway 188 (FIG. 9) joins the plenums 172 and 174. An exemplary connector passageway 188 may be cast in place. In an exemplary method of manufacture, a single ceramic core is used to cast the plenums 172 and 174 and connector passageway 188. In the investment casting process, the ceramic core and any additional cores may be overmolded with wax to form a pattern. Upon shelling, previously exposed portions of the ceramic core may become integrated with the shell so as to protrude from an interior surface of the shell that casts the platform inboard surface (of the casting). The exemplary connector passageway 188 is positioned to be subsurface to the platform inboard surface (of the casting) whereas the plenums 170, 172, and 174 are exposed to the surface and thus must be closed such as by the covers 160, 162, and 164. This exposure facilitates chemical decoring. The covers may be welded in place (e.g., first by tack welding for positioning then by a full perimeter welding for sealing and structural integrity). To facilitate this welding, the covers 160 and 162 are shaped to have two-point contact on either side of a gap 189. This allows the gap to be aligned with the center of the rib 176 to precisely position the covers and permit the welding.

In a similar fashion, the plenum 170 may feed a plenum 190 via a connector passageway 192. An exemplary plenum 190 is positioned along the suction side of the first airfoil near the leading edge thereof. The plenums 170, 190, and connector passageway 192 may also be cast by a single ceramic core. This may be the same ceramic core that casts the plenums 172 and 174 and their connector passageway 188 or may be separately formed.

Use of the connector passageway 188 facilitates drilling of the feed passageways from the plenum 174 rather than from the plenum 172. The former may present easier drill access. The exemplary plenum 190 feeds the outlet holes 122 via outlet passageways 194 (shown schematically by their centerlines). The exemplary plenum 174 feeds the outlet holes 124 via outlet passageways 196. The outlet passageways 194 and 196 may be drilled at the same time as the outlet passageways 178.

The passageway network of the exemplary cluster may have one or more of several advantageous properties. One advantage is that cooling air is introduced to both platform circumferential ends 86 and 88. This may be contrasted with a baseline situation wherein cooling air is introduced to only one of the ends. In such a baseline situation, the cooling air from that end will also serve to cool the adjacent other platform end of the adjacent cluster. However, cooling both ends may increase part life.

Another possible advantage involves the separate feeding of the plenums 170 and 172. The separate feeding of the plenums 170 and 172 reduces the possibilities of adverse interaction between the airflows through the two airfoils. This may be contrasted with a baseline situation wherein a single large plenum between the airfoils is fed with air from both airfoils. Such baseline mixing may present engineering problems. For example, it may be desirable to avoid backpressure in the plenum from air flowing from one of the airfoils to interfere with cooling air passing through the other airfoil. Also, the platform area between these plenums and the surface 74 may be subject to different heating considerations. The separate feeding may permit a more precise tailoring of airflow properties through each of the sets of passageways 178.

One or more embodiments of the present invention have been described. Nevertheless, it will be understood that various modifications may be made without departing from the spirit and scope of the invention. For example, the principles may be applied in the remanufacturing of an existing engine or the reengineering of an existing baseline engine configuration. In such a remanufacturing or reengineering situation, details of the baseline configuration may influence details of the particular implementation. Accordingly, other embodiments are within the scope of the following claims.

What is claimed is:

1. A method for manufacturing a vane cluster, the vane cluster comprising:
  a platform;
  a shroud;
  at least first and second airfoils extending between an outer face of the platform and an inner face of the shroud, each airfoil having a pressure side and a suction side, the pressure side of the first airfoil facing the suction side of the second airfoil; and
  a cooling passageway system, wherein:
  the cooling passageway system includes:
    at least one inlet in the shroud;
    at least one first feed passageway from the shroud to the platform through the first airfoil;
    at least one second feed passageway from the shroud to the platform through the second airfoil;
    a first platform cooling plenum to the pressure side of the first airfoil;
    a second platform cooling plenum to the suction side of the first airfoil; and
    first and second pluralities of outlet holes extending to first and second circumferential ends of the platform, the method comprising:
  manufacturing a casting by an investment casting process, the casting including precursors of the platform, shroud, first and second airfoils, first and second feed passageways, and first and second platform cooling plenums; and
  securing at least one cover over the first platform cooling plenum, wherein:
  the investment casting uses first and second feed cores to cast the first and second feed passageways and a single separate core for casting the first and second platform cooling plenums; and
  in the as-cast casting, the first platform cooling plenum precursor is open along an inboard surface of the platform precursor, but the second platform cooling plenum precursor is subsurface to said inboard surface.

2. The method of claim 1 wherein:
  the first platform cooling plenum is coupled to the at least one first feed passageway; and
  the second platform cooling plenum is coupled to the at least one first feed passageway via the first platform cooling plenum and a connector.

3. The method of claim 1 wherein:
  a third platform cooling plenum is located to the suction side of the second airfoil and coupled to the at least one second feed passageway.

4. The method of claim 1 further comprising:
  forming a plurality of outlet passageways extending from the first platform cooling plenum to respective outlets along the outer face of the platform.

5. A method for manufacturing a vane cluster, the vane cluster comprising:
  a platform;
  a shroud;
  at least first and second airfoils extending between an outer face of the platform and an inner face of the shroud, each airfoil having a pressure side and a suction side, the pressure side of the first airfoil facing the suction side of the second airfoil; and
  a cooling passageway system, wherein:
  the cooling passageway system includes:
    at least one inlet in the shroud;
    at least one first feed passageway from the shroud to the platform through the first airfoil;
    at least one second feed passageway from the shroud to the platform through the second airfoil;
    a first platform cooling plenum to the suction side of the first airfoil;
    a second platform cooling plenum to the pressure side of the second airfoil;
    a plurality of first outlet passageways extending from the first platform cooling plenum to a first circumferential end of the platform; and
    a plurality of second outlet passageways extending from the second platform cooling plenum to a second circumferential end of the platform, the method comprising:
  manufacturing a casting by an investment casting process, the casting including precursors of the platform, shroud, first and second airfoils, first and second feed passageways, and first and second platform cooling plenums; and
  securing at least one cover over the second platform cooling plenum, wherein:
  the investment casting uses first and second feed cores to cast the first and second feed passageways and at least one separate core for casting the first and second platform cooling plenums; and
  in the as-cast casting, the second platform cooling plenum precursor is open along an inboard surface of the platform precursor but the first platform cooling plenum precursor is subsurface to said inboard surface.

6. The method of claim 5 wherein:
  the cooling passageway system further includes:
    a third platform cooling plenum between the first and second airfoils.

7. The method of claim 6 further comprising:
  forming a plurality of outlet passageways extending from the third platform cooling plenum to respective outlets along the outer face of the platform.

8. The method of claim 5 wherein:
  the cooling passageway system further includes:
    third and fourth platform cooling plenums between the first and second airfoils.

9. The method of claim 8 wherein:
  a first connector passageway in the platform is positioned to feed the first platform cooling plenum from the third platform cooling plenum; and
  a second connector passageway in the platform is positioned to feed the fourth platform cooling plenum from the second platform cooling plenum.

10. The method of claim 9 wherein:
  at least one first feeder hole extends from the at least one first feed passageway to the third platform cooling plenum; and
  at least one second feeder hole extends from the at least one second feed passageway to the second platform cooling plenum.

11. The method of claim 9 comprising:
  a casting, essentially forming the airfoils and at least main body portions of the platform and shroud; and
  three cover plates welded to the platform main body portion to respectively enclose the second, third, and fourth platform cooling plenums.

12. A vane cluster comprising:
  a platform;
  a shroud;
  at least first and second airfoils extending between an outer face of the platform and an inner face of the shroud, each airfoil having a pressure side and a suction side, the pressure side of the first airfoil facing the suction side of the second airfoil; and a cooling passageway system, wherein:

the cooling passageway system includes:
- at least one inlet in the shroud;
- at least one first feed passageway from the shroud to the platform through the first airfoil;
- at least one second feed passageway from the shroud to the platform through the second airfoil;
- a first platform cooling plenum to the pressure side of the second airfoil; and
- a second platform cooling plenum to the suction side of the second airfoil; and
- a connector passageway, connecting the first platform cooling plenum to the second platform cooling plenum.

13. The cluster of claim 12 wherein:
a plurality of first outlet passageways extend from the first platform cooling plenum to an adjacent circumferential end of the platform; and
the connector passageway extends around a trailing edge of the second airfoil.

14. A method for manufacturing the cluster of claim 12 comprising:
manufacturing a casting by an investment casting process, the casting including precursors of the platform, shroud, first and second airfoils, first and second feed passageways, and first and second platform cooling plenums; and
securing at least one cover over the first and second platform cooling plenums.

15. The method of claim 14 wherein:
the investment casting uses first and second feed cores to cast the first and second feed passageways and at least one separate core for casting the first and second platform cooling plenums; and
in the as-cast casting, the first and second platform cooling plenum precursors are open along an inboard surface of the platform precursor and the connector passageway is subsurface.

16. A vane cluster comprising:
a platform;
a shroud;
at least first and second airfoils extending between an outer face of the platform and an inner face of the shroud, each airfoil having a pressure side and a suction side, the pressure side of the first airfoil facing the suction side of the second airfoil; and
a cooling passageway system, wherein:
the cooling passageway system includes:
- at least one inlet in the shroud;
- at least one first feed passageway from the shroud to the platform through the first airfoil;
- at least one second feed passageway from the shroud to the platform through the second airfoil;
- a first platform cooling plenum to the pressure side of the first airfoil and coupled to the at least one first feed passageway; and
- a second platform cooling plenum to the suction side of the first airfoil and coupled to the at least one first feed passageway.

17. The vane cluster of claim 16 comprising:
a casting forming at least portions of the platform, shroud, and first and second airfoils; and
at least one cover plate on the platform.

18. The vane cluster of claim 17 wherein:
the at least one cover plate comprises a first cover plate covering the first platform cooling plenum.

19. The vane cluster of claim 18 wherein:
the second platform cooling plenum is subsurface.

20. The vane cluster of claim 19 wherein:
the cooling passageway system includes a third platform cooling plenum to the pressure side of the second airfoil; and
a fourth platform cooling plenum to the suction side of the second airfoil.

21. The vane cluster of claim 20 wherein:
the at least one cover plate includes a second cover plate covering the third platform cooling plenum and a third cover plate covering the fourth platform cooling plenum.

22. The vane cluster of claim 21 wherein:
the fourth platform cooling plenum is between the second airfoil and the first platform cooling plenum.

23. The vane cluster of claim 22 wherein:
a first subsurface connector connects the first and second platform cooling plenums and a second subsurface connector connects the third and fourth platform cooling plenums.

24. A vane cluster comprising:
a platform;
a shroud;
at least first and second airfoils extending between an outer face of the platform and an inner face of the shroud, each airfoil having a pressure side and a suction side, the pressure side of the first airfoil facing the suction side of the second airfoil; and
a cooling passageway system, wherein:
the cooling passageway system includes:
- at least one inlet in the shroud;
- at least one first feed passageway from the shroud to the platform through the first airfoil;
- at least one second feed passageway from the shroud to the platform through the second airfoil;
- a first platform cooling plenum to the pressure side of the first airfoil;
- a second platform cooling plenum to the suction side of the first airfoil; and
- a third platform cooling plenum to the suction side of the second airfoil and coupled to the at least one second feed passageway.

25. A vane cluster comprising:
a platform;
a shroud;
at least first and second airfoils extending between an outer face of the platform and an inner face of the shroud, each airfoil having a pressure side and a suction side, the pressure side of the first airfoil facing the suction side of the second airfoil; and
a cooling passageway system, wherein:
the cooling passageway system includes:
- at least one inlet in the shroud;
- at least one first feed passageway from the shroud to the platform through the first airfoil;
- at least one second feed passageway from the shroud to the platform through the second airfoil;
- a first platform cooling plenum to the suction side of the first airfoil;
- a second platform cooling plenum to the pressure side of the second airfoil;
- third and fourth platform cooling plenums between the first and second airfoils;

a first connector passageway in the platform and positioned to feed the first platform cooling plenum from the third platform cooling plenum; and a second connector passageway in the platform and positioned to feed the fourth platform cooling plenum from the second platform cooling plenum.

26. The cluster of claim 25 wherein:

at least one first feeder hole extends from the at least one first feed passageway to the third platform cooling plenum; and at least one second feeder hole extends from the at least one second feed passageway to the second platform cooling plenum.

27. The cluster of claim 25 comprising:

a casting, essentially forming the airfoils and at least main body portions of the platform and shroud; and three cover plates welded to the platform main body portion to respectively enclose the second, third, and fourth platform cooling plenums, the first cooling plenum being internal to the casting.

* * * * *

UNITED STATES PATENT AND TRADEMARK OFFICE
CERTIFICATE OF CORRECTION

PATENT NO. : 7,625,172 B2
APPLICATION NO. : 11/412291
DATED : December 1, 2009
INVENTOR(S) : Walz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Twenty-sixth Day of October, 2010

David J. Kappos
*Director of the United States Patent and Trademark Office*